United States Patent
Friday et al.

(10) Patent No.: US 8,798,018 B2
(45) Date of Patent: *Aug. 5, 2014

(54) PRE-EMPTIVE ROAMING MECHANISM ALLOWING FOR ENHANCED QOS IN WIRELESS NETWORK ENVIRONMENTS

(75) Inventors: Robert J. Friday, Los Gatos, CA (US); Paul F. Dietrich, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/873,987

(22) Filed: Sep. 1, 2010

(65) Prior Publication Data

US 2010/0322198 A1   Dec. 23, 2010

Related U.S. Application Data

(63) Continuation of application No. 11/182,264, filed on Jul. 15, 2005, now Pat. No. 7,805,140.

(60) Provisional application No. 60/654,621, filed on Feb. 18, 2005.

(51) Int. Cl.
    *H04W 4/00* (2009.01)
(52) U.S. Cl.
    USPC ............ 370/338; 370/328; 370/329; 370/331
(58) Field of Classification Search
    None
    See application file for complete search history.

(56) References Cited

U.S. PATENT DOCUMENTS

| 4,398,063 | A | 8/1983 | Hass et al. |
| 5,067,171 | A | 11/1991 | Kawano |
| 5,491,692 | A | 2/1996 | Gunner et al. |
| 5,564,079 | A | 10/1996 | Olsson |
| 5,654,959 | A | 8/1997 | Baker et al. |
| 5,684,860 | A | 11/1997 | Milani et al. |
| 5,883,899 | A | 3/1999 | Dahlman et al. |

(Continued)

FOREIGN PATENT DOCUMENTS

| DE | 10245118 A1 | 4/2004 |
| EP | 0 930 514 | 7/1999 |

(Continued)

OTHER PUBLICATIONS

IEEE Standards 802.11F IEEE *Trial-Use Recommended Practice for Milti-Vendor Access Point Interoperability bia an Inter-Access Point Protocol Acrodd Distribution Systems Supporting IEEE 802.11 Operation*, IEEE Computer Society, The Institute of Electrical and Electronics Engineers, Inc., Jul. 14, 2003.

(Continued)

*Primary Examiner* — Faruk Hamza
*Assistant Examiner* — Diane Lo
(74) *Attorney, Agent, or Firm* — Baker Botts L.L.P.

(57) ABSTRACT

A preemptive roaming mechanism in wireless network environments. In one implementation, the present invention provides a wireless client that implements a preemptive roaming mode that, when an attribute of the signal (e.g., Signal to Noise Ratio (SNR), etc.) between the access point with which the client is currently associated crosses a threshold, scans for other access points with which to associate. In one implementation, the client switches between the scanning mode and a traffic mode to allow data to be transferred between the client and the current access point. The pre-emptive roaming functionality can be configured to support desired data rates or other QoS levels.

17 Claims, 8 Drawing Sheets

(56) References Cited

U.S. PATENT DOCUMENTS

| | | |
|---|---|---|
| 5,940,384 A | 8/1999 | Carney et al. |
| 6,081,229 A | 6/2000 | Soliman et al. |
| 6,097,956 A | 8/2000 | Veeravalli et al. |
| 6,104,928 A | 8/2000 | Waugh |
| 6,112,095 A | 8/2000 | Wax et al. |
| 6,115,605 A | 9/2000 | Siccardo et al. |
| 6,134,448 A | 10/2000 | Shoji et al. |
| 6,140,964 A | 10/2000 | Sugiura et al. |
| 6,167,274 A | 12/2000 | Smith |
| 6,198,935 B1 | 3/2001 | Saha et al. |
| 6,208,629 B1 | 3/2001 | Jaszewski et al. |
| 6,212,391 B1 | 4/2001 | Saleh et al. |
| 6,223,028 B1 | 4/2001 | Chang et al. |
| 6,240,077 B1 | 5/2001 | Vuong et al. |
| 6,243,413 B1 | 6/2001 | Beukema |
| 6,249,252 B1 | 6/2001 | Dupray |
| 6,259,406 B1 | 7/2001 | Sugiura et al. |
| 6,269,246 B1 | 7/2001 | Rao et al. |
| 6,275,190 B1 | 8/2001 | Sugiura et al. |
| 6,282,427 B1 | 8/2001 | Larsson et al. |
| 6,286,038 B1 | 9/2001 | Reichmeyer et al. |
| 6,304,218 B1 | 10/2001 | Sugiura et al. |
| 6,332,077 B1 | 12/2001 | Wu et al. |
| 6,338,140 B1 | 1/2002 | Owens et al. |
| 6,414,634 B1 | 7/2002 | Tekinay |
| 6,415,155 B1 | 7/2002 | Koshima et al. |
| 6,441,777 B1 | 8/2002 | McDonald |
| 6,456,892 B1 | 9/2002 | Dara-Abrams et al. |
| 6,473,038 B2 | 10/2002 | Patwari et al. |
| 6,473,413 B1 | 10/2002 | Chiou et al. |
| 6,490,259 B1 | 12/2002 | Agrawal et al. |
| 6,526,283 B1 | 2/2003 | Jang |
| 6,556,942 B1 | 4/2003 | Smith |
| 6,664,925 B1 | 12/2003 | Moore et al. |
| 6,754,488 B1 | 6/2004 | Won et al. |
| 6,760,318 B1 | 7/2004 | Bims |
| 6,760,671 B1 | 7/2004 | Batcher et al. |
| 6,766,453 B1 | 7/2004 | Nessett et al. |
| 6,788,658 B1 | 9/2004 | Bims |
| 6,799,047 B1 | 9/2004 | Bahi et al. |
| 6,810,428 B1 | 10/2004 | Larsen et al. |
| 6,917,819 B2 | 7/2005 | Collins |
| 6,925,069 B2 | 8/2005 | Koos et al. |
| 6,925,070 B2 | 8/2005 | Proctor, Jr. |
| 6,940,384 B2 | 8/2005 | Carney et al. |
| 6,954,641 B2 | 10/2005 | McKenna et al. |
| 6,957,067 B1 | 10/2005 | Iyer et al. |
| 6,990,428 B1 | 1/2006 | Kaiser et al. |
| 7,002,943 B2 | 2/2006 | Bhagwat et al. |
| 7,025,209 B2 | 4/2006 | Hawkins |
| 7,068,644 B1 | 6/2006 | McConnell et al. |
| 7,085,576 B2 | 8/2006 | Ranganathan |
| 7,089,009 B1 * | 8/2006 | Fauconnier ............... 455/445 |
| 7,099,669 B2 | 8/2006 | Sheffield |
| 7,127,258 B2 | 10/2006 | Zegelin |
| 7,133,909 B2 | 11/2006 | Bahl |
| 7,161,914 B2 | 1/2007 | Shoaib et al. |
| 7,164,663 B2 | 1/2007 | Frank et al. |
| 7,164,915 B2 | 1/2007 | Zaki |
| 7,212,837 B1 | 5/2007 | Calhoun et |
| 7,236,786 B2 | 6/2007 | Shen et al. |
| 7,269,151 B2 | 9/2007 | Diener et al. |
| 7,277,416 B1 | 10/2007 | Chang et al. |
| 7,286,833 B2 | 10/2007 | Friday et al. |
| 7,289,472 B2 | 10/2007 | Yano et al. |
| 7,313,113 B1 | 12/2007 | Hills et al. |
| 7,366,524 B2 | 4/2008 | Watanabe et al. |
| 7,400,604 B2 | 7/2008 | Lee et al. |
| 7,539,169 B1 | 5/2009 | O'Hara, Jr. et al. |
| 2002/0046258 A1 | 4/2002 | Yasushi et al. |
| 2002/0107017 A1 | 8/2002 | Song |
| 2002/0168958 A1 | 11/2002 | Ford et al. |
| 2002/0174335 A1 | 11/2002 | Zhang et al. |
| 2002/0188723 A1 | 12/2002 | Choi |
| 2002/0193116 A1 | 12/2002 | Agrawal et al. |
| 2002/0194384 A1 | 12/2002 | Habetha |
| 2003/0022686 A1 | 1/2003 | Soomro et al. |
| 2003/0023746 A1 | 1/2003 | Loguinov |
| 2003/0033423 A1 | 2/2003 | Okabe et al. |
| 2003/0117985 A1 | 6/2003 | Fujii et al. |
| 2003/0134642 A1 | 7/2003 | Kostic et al. |
| 2003/0135762 A1 | 7/2003 | Macaulay |
| 2003/0139197 A1 | 7/2003 | Kostic et al. |
| 2003/0181215 A1 | 9/2003 | Cromer et al. |
| 2003/0188006 A1 | 10/2003 | Bard |
| 2003/0198208 A1 | 10/2003 | Koos, Jr. et al. |
| 2003/0219008 A1 | 11/2003 | Hrastar |
| 2003/0224787 A1 | 12/2003 | Gandolfo |
| 2004/0003285 A1 | 1/2004 | Whelan et al. |
| 2004/0008652 A1 | 1/2004 | Tanzella et al. |
| 2004/0022222 A1 | 2/2004 | Clisham |
| 2004/0023640 A1 | 2/2004 | Ballai |
| 2004/0047324 A1 | 3/2004 | Diener |
| 2004/0049699 A1 | 3/2004 | Griffith et al. |
| 2004/0076134 A1 | 4/2004 | Barber et al. |
| 2004/0077341 A1 | 4/2004 | Chandranmenon et al. |
| 2004/0103194 A1 | 5/2004 | Islam et al. |
| 2004/0110503 A1 * | 6/2004 | Park ................... 455/435.1 |
| 2004/0111607 A1 | 6/2004 | Yallepeddy |
| 2004/0165563 A1 | 8/2004 | Hsu et al. |
| 2004/0176108 A1 | 9/2004 | Misikangas |
| 2004/0198220 A1 | 10/2004 | Whelan et al. |
| 2004/0202141 A1 * | 10/2004 | Sinivaara et al. ............. 370/338 |
| 2004/0203779 A1 | 10/2004 | Gabara |
| 2004/0203910 A1 | 10/2004 | Hind et al. |
| 2004/0255331 A1 | 12/2004 | Inoue et al. |
| 2005/0030945 A1 | 2/2005 | Sarikaya et al. |
| 2005/0060319 A1 | 3/2005 | Douglas et al. |
| 2005/0073979 A1 | 4/2005 | Barber et al. |
| 2005/0114649 A1 | 5/2005 | Challener et al. |
| 2005/0137790 A1 | 6/2005 | Yamada et al. |
| 2005/0138178 A1 | 6/2005 | Astarabadi |
| 2005/0171720 A1 | 8/2005 | Olson et al. |
| 2005/0207381 A1 | 9/2005 | Aljadeff et al. |
| 2005/0208950 A1 * | 9/2005 | Hasse ................... 455/453 |
| 2006/0040666 A1 | 2/2006 | Narasimha et al. |
| 2006/0045033 A1 | 3/2006 | Fukuhara |
| 2006/0072493 A1 * | 4/2006 | Ginzburg et al. ............. 370/328 |
| 2006/0187873 A1 | 8/2006 | Friday et al. |
| 2007/0232307 A1 * | 10/2007 | Ibrahim et al. ................ 455/436 |

FOREIGN PATENT DOCUMENTS

| | | |
|---|---|---|
| EP | 0 967 816 | 12/1999 |
| EP | 0967818 A2 | 12/1999 |
| EP | 1 018 457 | 7/2000 |
| EP | 1026910 A1 | 8/2000 |
| EP | 1075160 A1 | 2/2001 |
| EP | 1296 531 | 3/2003 |
| EP | 1 301 055 | 4/2003 |
| JP | 02044929 | 2/1990 |
| JP | 2004340864 | 12/2004 |
| WO | WO 97/33386 | 9/1997 |
| WO | WO 98/41048 | 12/1999 |
| WO | WO 99/08909 | 7/2000 |
| WO | WO 02/43425 | 5/2002 |
| WO | WO 02/054813 | 7/2002 |
| WO | WO 03/023443 | 3/2003 |

OTHER PUBLICATIONS

USPTO, Office Action for U.S. Appl. No. 11/443,823, filed May 31, 2006 in the name of Allan Thomson, 11 pages, Mar. 31, 2009.

Dan Simone, 802.11k makes WLANs measure up. Networkworld. com, Mar. 29, 2004, http://www.networkworld.com/news/tech/2004/0329techupdate.html.

Fanny Mlinarsy, metrics and Methods Bring VoWLAN Success, wsdmag.com, Mar. 2005 http://www.wsdmag.com/Articles/Print.cfm?ArticleID=10003.

Rob Tillotson, CoPilot Live GPS Navigation System, Gadgeteer Hands on Review, The Gadgeteer, Apr. 12, 2006.

International Standard, ISO/IEC 8802-11 ANSI/IEEE std. 802.11, 1999 Edition, Part II: Wireless LAN medium Access Control (MAC) and Physical Layer (PHY) specifications, pp. 122-137, 1999.

(56) References Cited

OTHER PUBLICATIONS

"tcp-masq" Internet citation http://speed.cis.nctu.edu.tw/bandwith/opensource/. Daa Sheet Cisco Aironet 1200 Series Access Point, pp. 1-13, posted Mar. 11, 2002.

Chirumamilla, Mohan K. and Ramamurthy, Byrav, "Agent Based Intrusion Detection and Response System for Wireless LANs" IEEE Int'l conference on Communications, 2003, vol. 1, pp. 492-495.

"IBM Research Demonstrates Industry's First Auditig Tool for Wireless Network Security" Jul. 12, 2001, Hawthorne, N.Y. IBM Research News, 'Online, URL: http://domino.research.ibm.com/comm/re.nsf/pages/news.20010712_wireless.html.

"IBM Researchers Demonstrate Industry's First Self-Diagnostic Wireless Security Monitoring Tool" Jun. 21, 2002, Hawthonre NY IBM NIEUWS, 'Online! URL: http://domino.research.ibm.com/comm/re.nsf/pages/news.20020617_dwsa.html.

"Ekahau Logical Areas-location enabling the Wi-Fi network", Apr. 4, 2003, Ekahau, Inc., Saratoga, CA. Company's URL: www.ekahau.com.

"Ekahau Positioning Engine 2.0: Product Overview", Apr. 4, 2003, Ekahau, Inc., Saratoga, CA. Company's URL: www.ekahau.com/positioningengine/.

"Ekahau Positioning Engine 2.0: Data Sheet", Apr. 4, 2003, Ekahau, Inc., Saratoga, CA. URL: www.ekahau.com/pdf/EPE_2.0_datasheet.PDF.

"Indoor Positioning in 802.1 1b Networks," Apr. 4, 2003, Ekahau, Inc., Saratoga, CA. URL: www.ekahau.com/products/positioningengine.html.

"InFielder" Apr. 22, 2003. Wireless Valley, Austin, Texas URL: http://www.wirelessvalley.com/Products/InFielder/InFielder.asp.

"LANFielder", Apr. 22, 2003 Wireless Valley, Austin, Texas URL: http://www.wirelessvalley.com/Products/LANFielder/LANFielder.asp.

"Optimatic", Apr. 22, 2003 Wireless Valley, Austin, Texas URL: http://www.wirelessvalley.com/Products/Optimatic/Optimatic.asp.

"Predictor", Apr. 22, 2003 Wireless Valley, Austin, Texas URL: http://www.wirelessvalley.com/Products/Predictor/Predictor.asp.

"LANFielder Product Literature", Feb. 10, 2004, Wireless Valley, Austin, Texas, URL: http://www.wirelessvalley.com/Assets/brochures/LanFielder.pdf.

Conley, C., "Securing WLANs with Location-Enabled Networks" Wireless Security Perspectives, vol. %, No. 3, Mar. 2003, Organization's URL: www/cnp-wireless.com/wsp.html.

"Company Information" Apr. 6, 2004 Corsair Communications: A LightBridge Company, Burlington, MA. Company's URL: www.lightbridge.com.

"Corporate Fact Sheet" Aruba Wireless Networks, San Jose, CA Feb. 10, 2004. URL: http://www.arubanetworks.com/pdf/corporate_fact_sheet.pdf.

"Airwave Rogue Access Point Detection", 2002 Airwave Wireless, Inc. San Mateo, CA. URL: http://airwave.com/features.html.

Geier, J. "Identifying Rogue Access Points", Jan. 6, 2003. Wi-Fi Planet Tutorials. URL: http://www.wi-fiplanet.com/tutorials/article/php/1564431.

Brewin, B. "IBM Develops Tool to Detect Rogue Wireless LAN Access Points" Jun. 17, 2002, Computerworld, Framington, MA. URL: http://www.computerworld.com/mobiletopics/mobile/story/0,10801,72065.00 html.

Bulusu, N., Heldermann, J., Estrin, D. "GPS-less Low Cost Outdoor Localization for Very Small Devices," *IEEE Personal Communications*, Oct. 2000 URL: http://lecs.cs.ucla.edu/-bulusu/papers/Bulusu00a.pdf.

"Accessing Wireless Security with AiroPeek and AiroPeek NX," A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

"AiroPeek and Wireless Security: Identifying and Locating Rogue Access Points", A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

Craiger, J.P. "802.11, 802.1x and Wireless Security," Jun. 23, 2002. From the SANS' Information Security Reading Room on www.sans.org, The SANS Institute, Bethesda, MD URL: http://www.sans.org.rr/papers/68171.pdf.

Baily, S. "Is IEEE 802.1x Ready for General Deployment?" Apr. 7, 2002, From the SANS' Information Security Reading Room on www.sans.org, The SANS Institute, Bethesda, MD URL: http://www.sans.org.rr/papers/9/709.pdf.

PCT Notification of Transmittal of the International Search Report and the Written Opinion of the International Searching authority or the Declaration (PCT Rule 44.1), dated Sep. 18, 2006, International Application No. PCT/US2006/00078.

U.S. Appl. No. 10/587,879, Final Office Action, May 5, 2009.

U.S. Appl. No. 10/587,879, Non-Final Office Action, Aug. 21, 2008.

Office action for CN 200780009822.4, Mar. 30, 2010.

Airwave Wireless, Inc., Wireless Network Management Solutions, Airwave Rogue Access Point Detection, San Mateo, CA http://airwave.com/features.html, 2002.

Aruba Wireless Networks, Corporate Fact Sheet, San Jose, CA, http://www.arubanetworks.com/pdf/corporate.sub.--fact.sub.--sheet.pdf, Feb. 10, 2004.

Baily, S. et al., Is IEEE 802.1X Ready for General Deployment?, Apr. 7, 2002. From The SANS Institute, Information Security Reading Room www.sans.org, Bethesda, MD, http://www.sans.org/rr/papers/9/709.pdf.

Brewin, B.et al., IBM Develops Tool to Detect Rogue Wireless, Computerworld and IDG company, Framingham, MA, http://www.computerworld.com/mobiletopics/mobile/story/0,10801,72065,00.html, Jun. 17, 2002.

Bulusu, N., et al., GPS-Less Low Cost Outdoor Localization for Very Small Device, IEEE Personal Communications, http://lecs.cs.ucla.edu/.about.bulusu/papers/Bulusu00a.pdf, Oct. 2000.

Chiruimamilla et al., Agent Based Intrusion Detection and Response System for Wireless LANS, IEEE Int'l Conference on Communications, vol. 1, pp. 492-496, 2003.

Cisco, Data Sheet Cisco Aironet 1200 Series Access Point, "TCP-MASQ" Internet citation http://speed.cis.nctu.edu.tw/bandwith/opensource/. pp. 1-13. Mar. 11, 2002.

Conley, C. et al., Securing WLANS With Location-Enabled Networks, Wireless Security Perspectives, vol. 5(3), Organization's URL: www.cnp-wireless.com/wsp.html, Mar. 2003.

Corsair Communications: A Lightbridge Company, Company Information, Burlington, MA, Company's URL: www.lightbridge.com, Mar. 7, 2006.

Craiger, J. P. et al., 802.11, 802.1X, and Wireless Security, From the SANS Institute, Information Security Reading Room on www.sans.org, Bethesda, MD, URL: http://www.sans.org/rr/papers/68/171.pdf, Jun. 23, 2002.

Davi G.et al., Using Picocells to Build High-Throughput 802.11 Networks, Circle 14 or visit freeproductinfo.net/rfd, www.rfdesign.com, Alternative Wireless, pp. 16, 18, 20, Jul. 2004.

Ekahau, Inc., Ekahau Logical Areas-Location Enabling the Wi-Fi Network, Saratoga, CA, Company's URL: www.ekahau.com, Apr. 4, 2003.

Ekahau, Inc., Ekahau Positioning Engine 2.0: Data Sheet, Saratoga, CA, URL: http://www.ekahau.com/pdf/EPE.sub.--2.0.sub.--datasheet.PDF, Apr. 4, 2003.

Ekahau, Inc., Ekahau Positioning Engine 2.0: Product Overview, Saratoga, CA, http://www.ekahau.com/products/positioningengine/, Apr. 4, 2003.

Ekahau, Inc., Indoor Positioning in 802.11B Networks, Saratoga, CA, http://www.ekahau.com/products/positioningengine/features.html, Apr. 4, 2003.

Geier, J. et al., Identifying Rogue Access Points, Wi-Fi Planet Tutorials, http://www.wi-fiplanet.com/tutorials/article.php/1564431, Jan. 6, 2003.

Hawthorne et al., IBM Research Demonstrates Industry's First Auditing Tool for Wireless Network Security, N.Y. IBM Research News Online, http://domino.research.ibm.com/comm/pr.nsf/pages/news.20010712.sub.--wire- less.html, Jul. 12, 2001.

(56) References Cited

OTHER PUBLICATIONS

Hawthorne et al., IBM Researchers Demonstrate Industry's First Self-Diagnostic Wireless Security Monitoring Tool, N.Y. N.Y. IBM Research News Online, http://domino.research.ibm.com/comm/pr.nsf/pages/news.20020617.sub.--dwsa- .html, Jun. 21, 2002.
PCT/US2006/00078, PCT Notification of Transmittal of the International Search Report and The Written Opinion of the International Searching Authority, or the Declaration (PCT Rule 44.1), Sep. 18, 2006.
International Standard ISO/IEC 8802-11 ANSI/IEEE std. 802.11, 1999 Edition, Information Technology-Telecommunications and information exchange between systems-Local and metropolitan area networks-Specific requirements-Part 11: Wireless LAN medium Access Control (MAC) and Physical Layer (PHY) specifications, pp. 122-137, 1999.
Kwak, Joe et al., Interdigital, WLAN Handoff Scenarios, Example Handoffs With RRM Measurements and Network Assistance, IEEE 802-11, 13 pages, Mar. 13, 2003.
Mlinarsy, Fanny, Metrics and Methods Bring VowLAN Success, http://www.wsdmag.com/Articles/Print.cft?ArticleID=10003, Mar. 2005.
Simone, Dan et al., Data Sheet Cisco Aironet 1200 Series Access Point, 802.1 1k makes WLANs measure up, http://www.networkworld.com/news/tech/2004/0329techupdate.html, Mar. 29, 2004.
Tillotson, Rob et al., Copilot Live GPS Navigation System, Gadgeteer Hands on Review, The Gadgeteer, Apr. 12, 2006.
WildPackets Inc., Airopeek and Wireless Security: Identifying and Locating Rogue Access Points, A WildPackets Academy Tutorial Walnut Creek, CA, http://www.wildpackets.com/elements/whitepapers/RogueAccessPoints.pdf, Jan. 16, 2003.
WildPackets Inc., Assessing Wireless Security With Airopeek and Airopeek NX, A WildPackets Academy Tutorial, pp. 1-5, Walnut Creek, CA www.wildpackets.com/elements/whitepapers/AiroPeek.sub.--Security.pdf, Jan. 16, 2003.
Wireless Valley, Infielder, Austin, TX, http://www.wirelessvalley.com/Products/InFielder/InFielder.asp, Apr. 22, 2003.
Wireless Valley, Lanfielder, Austin, TX, http://www.wirelessvalley.com/Products/LANFielder/LANFielder.asp, Apr. 22, 2003.
Wireless Valley, Optimatic, Austin, TX, http://www.wirelessvalley.com/Products/Optimatic/Optimatic.asp, Apr. 22, 2003.
Wireless Valley, Austin, Lanfielder Product Literature, TX, URL: http://www.wirelessvalley.com/Assets/brochures/LanFielder.pdf, Feb. 10, 2004.
Wireless Valley, Predictor, Austin, TX, http://www.wirelessvalley.com/Products/Predictor/Predictor.asp, Apr. 22, 2003.

\* cited by examiner

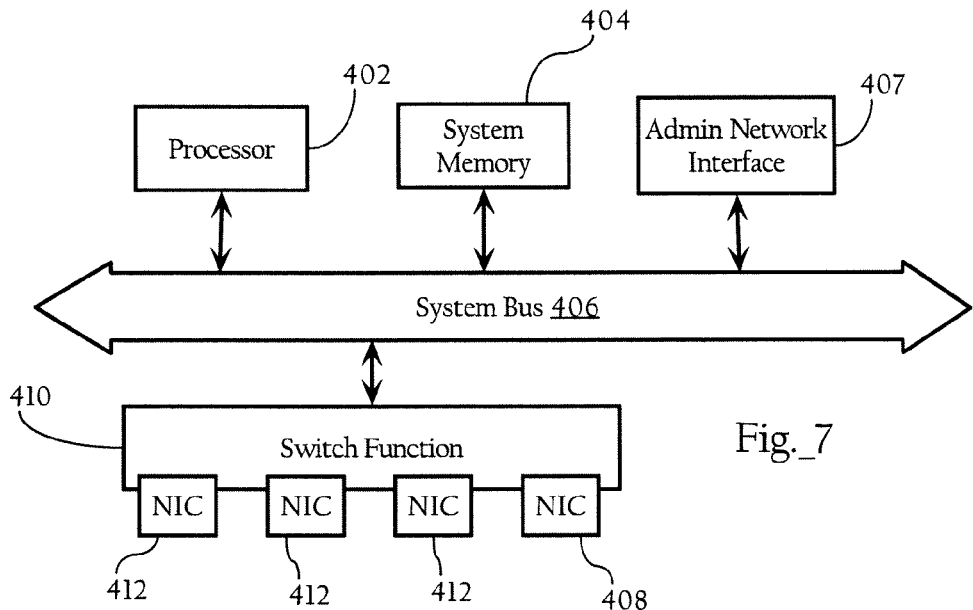
Fig._7
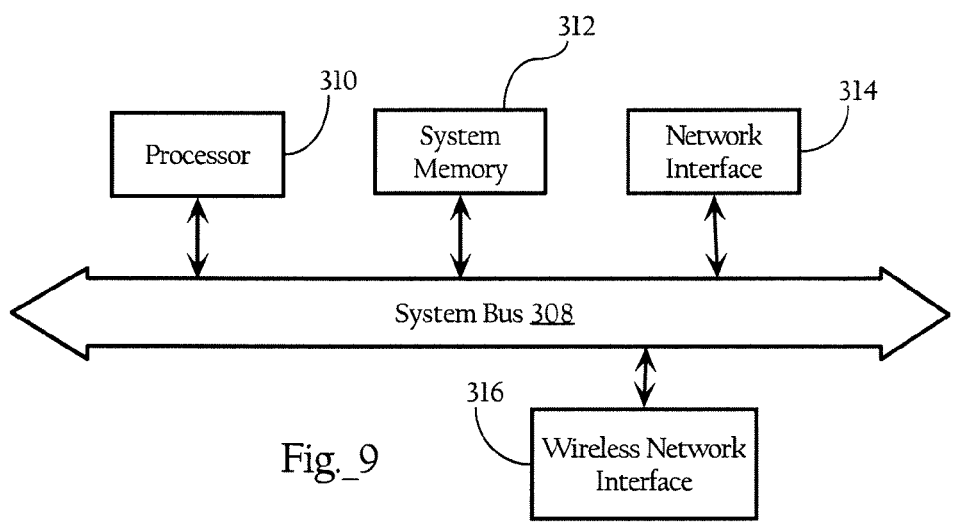
Fig._9

PRE-EMPTIVE ROAMING MECHANISM ALLOWING FOR ENHANCED QOS IN WIRELESS NETWORK ENVIRONMENTS

CROSS-REFERENCE TO RELATED APPLICATIONS

The present application is a continuation of U.S. application Ser. No. 11/182,264 filed Jul. 15, 2005 and entitled "Pre-Emptive Roaming Mechanism allowing for Enhanced QoS in Wireless Network Environments" which claims priority to U.S. Provisional Application Ser. No. 60/654,621 filed Feb. 18, 2005, entitled "Pre-Emptive Roaming Mechanism Allowing for Enhanced QoS in Wireless Network Environments," which is incorporated herein for all purposes.

This application also makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 10/447,735 in the name of Robert B. O'Hara, Jr., Robert J. Friday, Patrice R. Calhoun and Paul F. Dietrich, entitled "Wireless Network Infrastructure including Wireless Discovery and Communication Mechanism."

FIELD OF THE INVENTION

The present invention relates to wireless networks and, more particularly, to methods, apparatuses and systems facilitating roaming in wireless network environments.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing all physical and wireless media access protocol information from the protocol frames that are passed onto the infrastructure network. This results in uncoordinated handoffs of wireless clients moving between access points. An uncoordinated system of access points makes it difficult to manage a large number of access points, because there is no point of coordination. For example, known prior art wireless network systems such as conventional 802.11 WLAN systems provide the initial handshaking, access authentication and access association at a remote node without attention to overall network loading and signal quality.

This type of distributed architecture creates many problems affecting network management, mobility, and performance. Since each wireless LAN access point is a separate managed device, a distributed architecture in general introduces many new managed elements in the network without sufficient attention to their global effects. Since the access points act in their own self-interest and are not aware of the actions taken by surrounding access points, they handle mobility (e.g., handoff actions) as a local event, which significantly increases latency.

U.S. application Ser. Nos. 10/155,938 and 10/407,357, identified above, disclose a hierarchical wireless network architecture that optimizes network management and performance of a relatively autonomously-managed WLAN. According to the system architecture, a central control element (wireless switch) manages and controls one more access elements. These light-weight access elements perform real-time communication functions, such as data transfer and acknowledgements, while the central control element manages the connection between the access element and one or more wireless client devices.

A vital function to the operation of WLANs is roaming—i.e., the handoff of a client from one access point to another as the client roams about the coverage area provided by the wireless network infrastructure. During a handoff event, a wireless client essentially abandons its connection with one access point and establishes a new connection with another, resulting in a small period without connectivity and therefore possible packet loss. A handoff event can be divided into three phases: 1) scanning/probing, 2) re-authentication, and 3) state information transfer. When the signal quality between an access point and a client degrades, the client or mobile station sensing that connectivity has been lost initiates a handoff by scanning available RF channels for access points with which to associate. Scanning for access points can be both a passive mechanism (e.g., detecting beacon frames transmitted by the access points), and an active mechanism (e.g., broadcasting probe responses and receiving probe requests). After selecting an access point identified during the scan, the client or mobile station attempts to associate with the selected access point. In this re-association phase, the wireless client and the selected access point engage in a handshake to establish the connection.

In 802.11 WLANs, a typical handoff may also involve an exchange of messages between the prior and new access point to complete a transfer of physical/link layer connectivity between one access point and another access point. The message exchanges may include the transfer of connection state information, such as authentication credentials, between the prior access point and the new access point as well. The interaction between access points can be accomplished using standard or proprietary protocols. For example, the draft IEEE 802.11F specification provides a recommended general framework for the exchange of connection state information between access points during a client handoff. For example, when a wireless client discovers a new access point, it transmits a re-association message, including the BSSID of the old access point, to the new access point. The new access point uses a mechanism to resolve the address of the old access point and transmits a request for the connection state information of the client. In hierarchical wireless networks, the handoff can occur between two access points managed by the same wireless switch, or between access points managed by different wireless switches. In the former case, the transfer of connection state information between access points is either not required or greatly simplified, as this connection state information is maintained by a common wireless switch. Client handoffs that implicate two wireless switches, however, may require the exchange of wireless connection state information between the wireless switches. While the use of the inter-access point protocol set forth in the draft 802.11F specification to transfer state information between the switches is effective, the mapping of BSSIDs to wireless switch addresses presents configuration overhead, especially for large scale deployments. For example, the 802.11F specification discloses that RADIUS servers may be used to provide the mapping between the BSSID and the wireless switch. Furthermore, the 802.11F specification does not address the situation where a client attempts to re-associate with two switches in alternating succession, or with multiple switches, as it roams about the wireless network environment.

In light of the foregoing, the latency associated with scanning for access points and subsequently associating with a discovered access point may be too large, especially where the QoS required by some network applications is relatively high. Accordingly, a need in the art exists for methods, apparatuses and systems that reduce the latency associated with roaming in wireless networks. Embodiments of the present invention substantially fulfill this need.

DESCRIPTION OF THE DRAWINGS

FIG. 7 is a functional block diagram illustrating the components of a central control element according to one embodiment of the invention.

FIG. 9 is a functional block diagram illustrating the components of an access element according to one embodiment of the invention.

DESCRIPTION OF PREFERRED EMBODIMENT(S)

A. Network Environment Overview

For didactic purposes, an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

Figure 1:
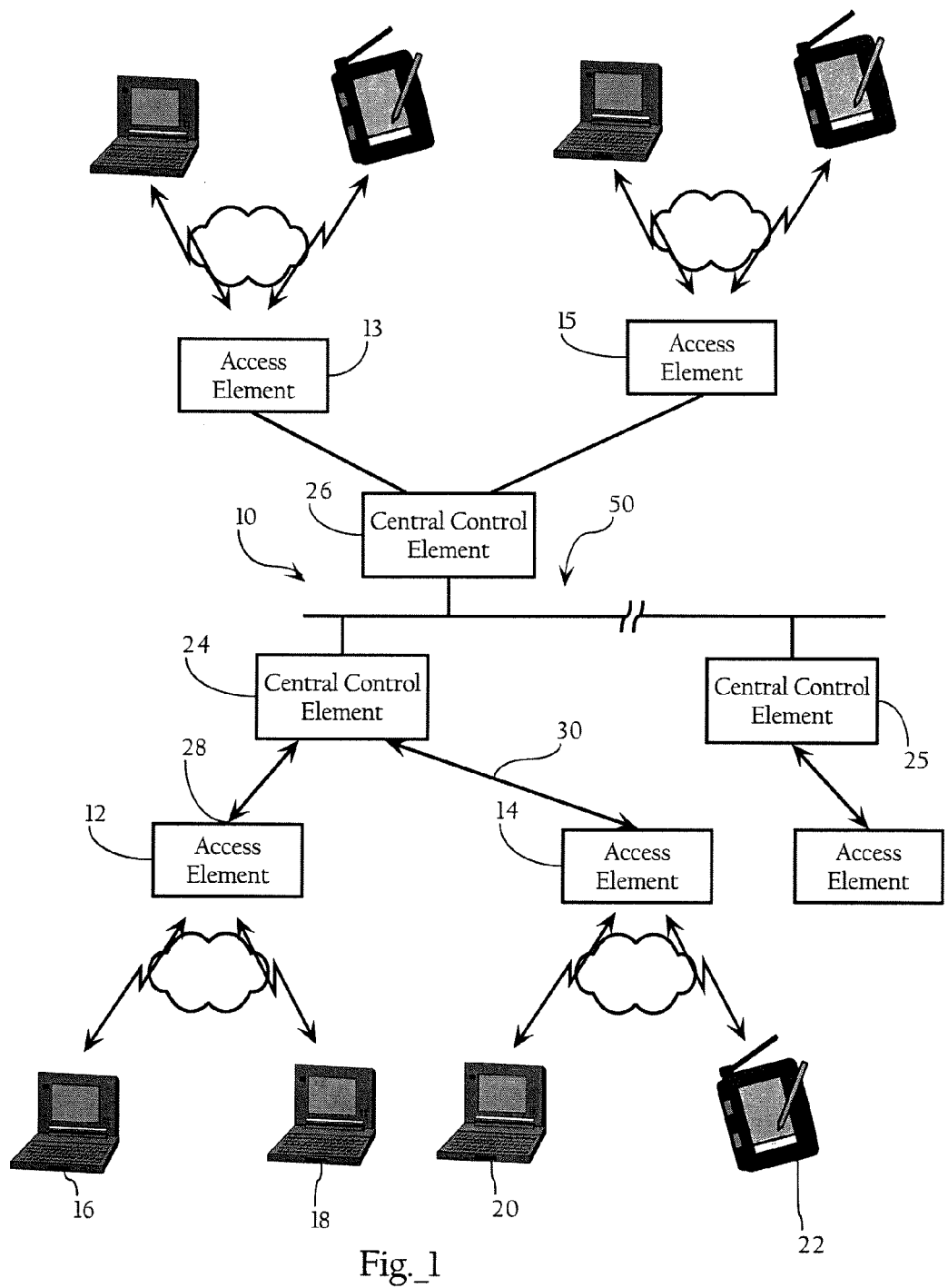
FIG. 1 is a functional block diagram illustrating a wireless network system according to an embodiment of the present invention.
Figure 5:
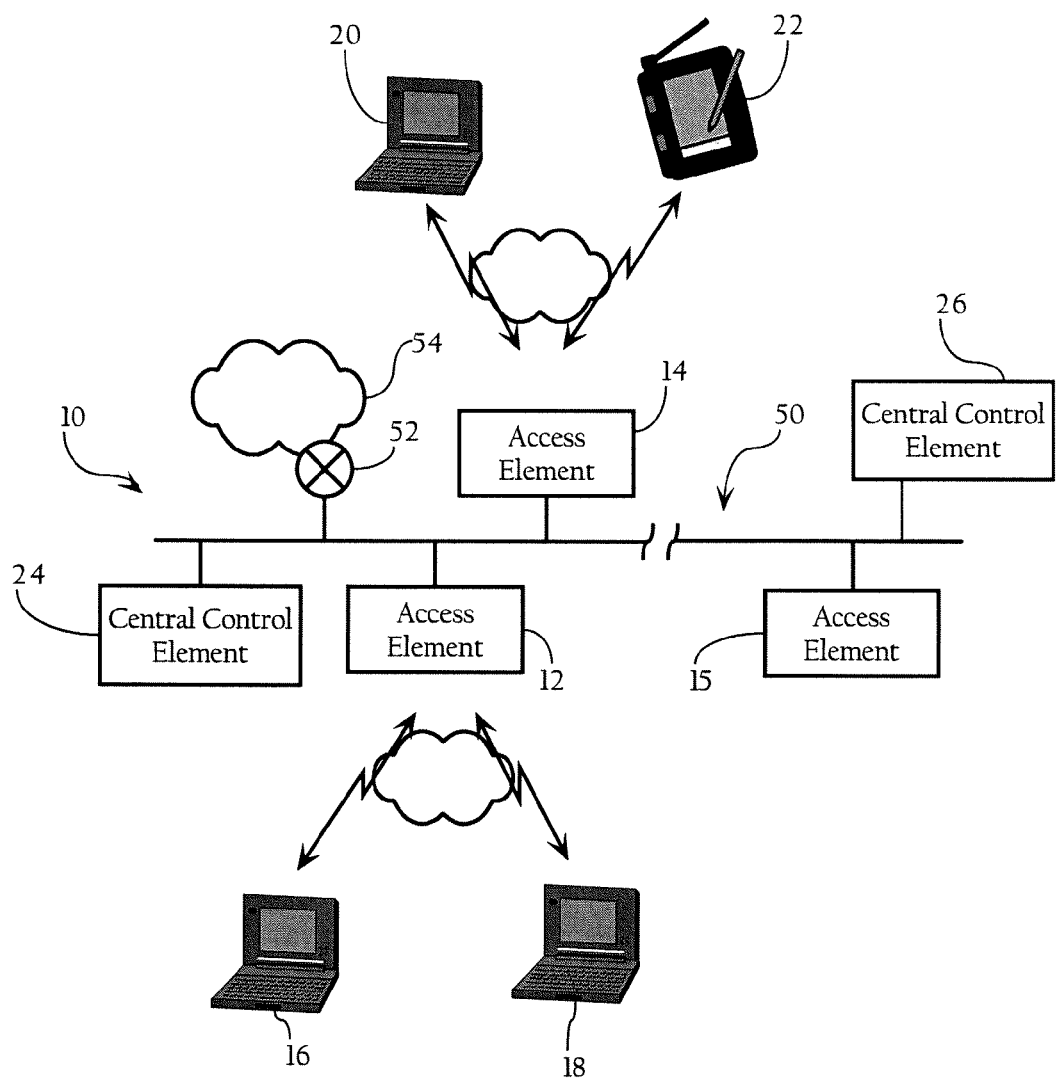
FIG. 5 is a functional block diagram illustrating an alternative wireless network system architecture.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 25, 26, and means for communication between the access elements and the central control elements, typically direct line access 28, 30, but potentially a wireless backbone, fiber or other reliable link. As disclosed in U.S. patent application Ser. No. 10/407,357, in another embodiment, the access elements, such as access elements 12, 14 are directly connected to network 50 or a virtual local area network (VLAN) for communication with a corresponding central control element 24, 26. See FIG. 5. Network 50, in one implementation, is an Ethernet LAN, a combination of LAN segments, or any other suitable network. For purposes of this disclosure, access elements, access points and APs are used interchangeably. Furthermore, the network may further include other functionality not illustrated, such as DHCP proxies and servers, and RADIUS or other authentication functionality.

The access elements 12-15 are operative to communicate with the client remote elements 16, 18, 20, 22 using a wireless local area network (WLAN) protocol (e.g., IEEE 802.11a or 802.11b/g, etc.). The communications means 28, 30 between the access elements 12, 14 and the central control element 24 is typically an Ethernet link or network, but it could be anything else which is appropriate to the environment. As described in U.S. Application Ser. Nos. 10/155,938 and 10/407,357, the access elements 12, 14 and the central control element 24, in one implementation, tunnel network traffic associated with corresponding remote client elements 16, 18; 20, 22 via direct access lines 28 and 30, respectively, or a LAN. Central control element 24 is also operative to bridge the network traffic between the remote client elements 16, 18; 20, 22 transmitted through the tunnel with corresponding access elements 12, 14. In one implementation, the central control elements are Airespace 4100 WLAN switches, while the access elements are Airespace 1200 Access Points, both offered by Airespace, Inc. of San Jose, Calif. As FIG. 7 shows, in one implementation, the central control elements each comprise a switch function or fabric 410 comprising a network interface 408 (e.g., a Ethernet adapter) for connection to network 50 and corresponding network interfaces 412 for connection to the access elements, a processor 402, a memory 404, one or more software modules, stored in the memory 402, including instructions for performing the functions described herein, and a system bus 406 operably connecting these components. The central control elements may optionally include an administrative network interface 407 allowing for administrative access for such purposes as configuration and diagnostic access. Still further, access elements 12, 14 typically comprise a processor 310, a memory 312, a network interface 314 (e.g., an 802.3 interface) for communication with a central control element, and a wireless network interface 316 (e.g., an IEEE 802.11 WLAN interface) for wireless communication with remote client elements, one or more software modules including instructions for performing the functions described herein, and a system bus 308 operably connecting these components (see FIG. 9).

In one embodiment, the access elements, such as access elements 12, 14, include functionality allowing for detection of the signal strength, and other attributes, of the signal received from client remote elements and/or other access elements. For example, the IEEE 802.11 standard defines a mechanism by which RF energy is measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in SNR which is the ratio of Signal to Noise, rather than or in addition to RSSI which is an absolute estimate of signal power. Many chip sets include functionality and corresponding APIs to allow for a determination of signal-to-noise ratios (SNRs) associated with packets received from client remote elements. In one embodiment, access elements 12, 14 include the detected signal strength and/or SNR value associated with a packet in the encapsulating headers used to tunnel the wireless packets to central control element 24. As discussed below, the remote client elements, in one embodiment, include signal attribute detection functionality as well.

In one implementation, remote client elements include a processor, a memory, a wireless network interface, and a wireless network interface driver that includes logic directed to the pre-emptive roaming functions described herein. In one implementation, the present invention can be embodied in a driver code object stored on a computer-readable medium, or embodied in a carrier wave expressing data signals transmitted to a remote device, that when installed on a remote client element implements the pre-emptive roaming functions described herein.

Figure 8:
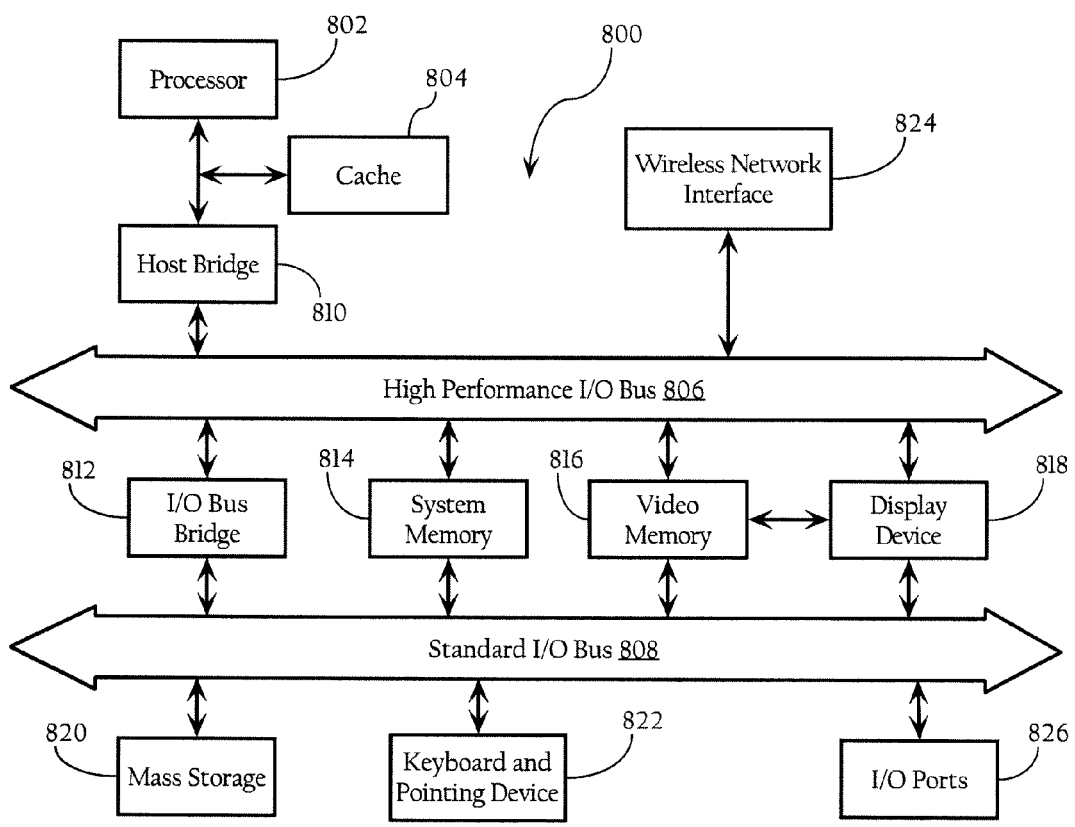
FIG. 8 is a functional block diagram illustrating the components of a wireless client according to one embodiment of the invention.

FIG. 8 illustrates, for didactic purposes, the hardware architecture of a wireless client according to one implementation of the present invention. The present invention, however, can be implemented on a wide variety of computer system architectures, such as Personal Digital Assistants, Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 8 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, wireless network interface 824 is used to provide communication between system 800 and any of a wide range of wireless networks, such as a WLAN (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

As discussed above, in one embodiment, the operations of the client-side roaming functionality described herein are implemented as a series of software routines run by hardware system 800 of FIG. 8. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the present invention is implemented in discrete hardware or firmware.

As described in the above-identified patent applications, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and association requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control elements 25, 26 and associated access elements 13, 15 operate in a similar or identical manner. Other system architectures are possible. For example, U.S. application Ser. No. 10/407,357 discloses a system architecture where the access elements, such as access elements 12-15, are directly connected to LAN segment 10.

Figure 6:
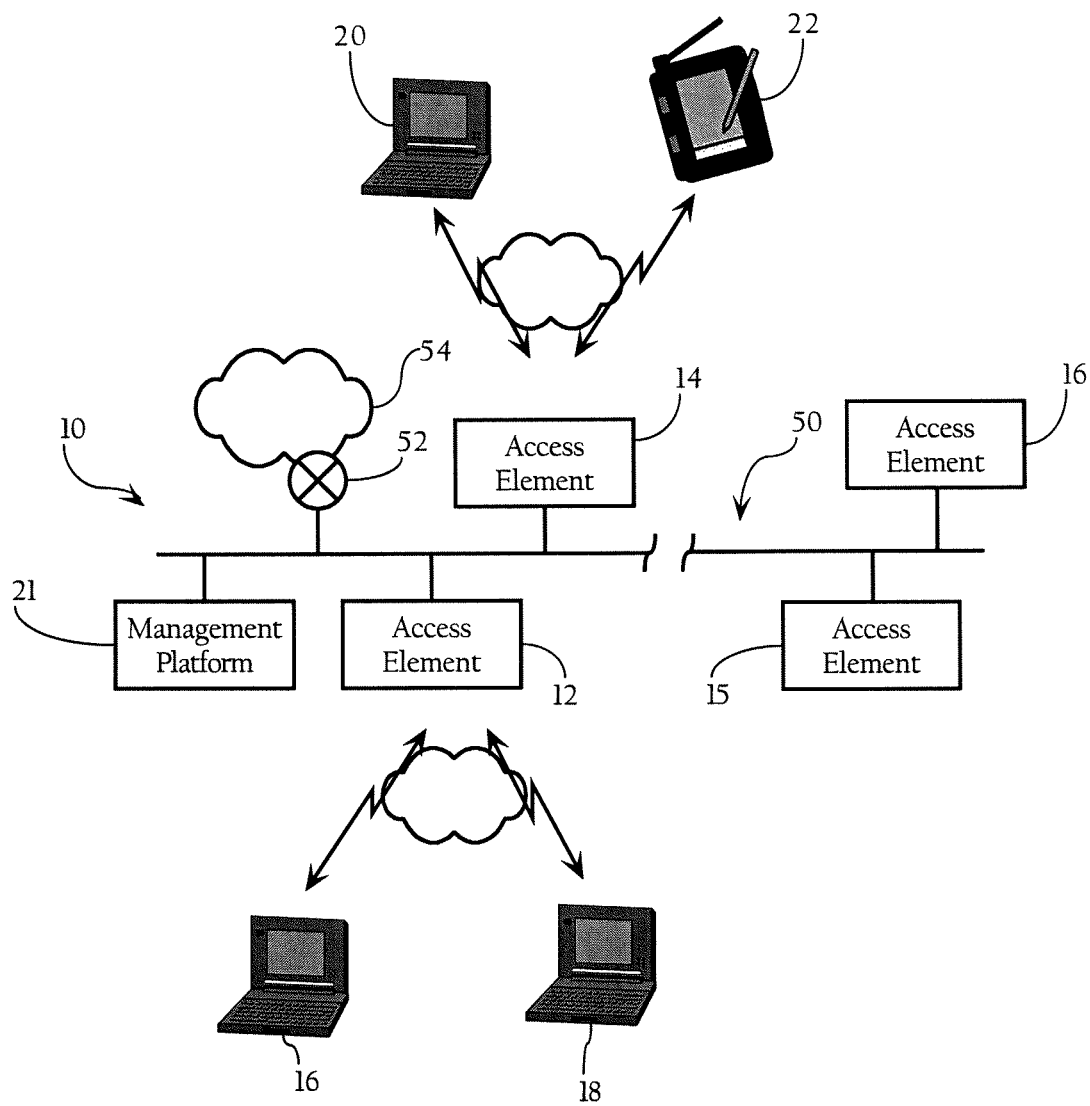
FIG. 6 is a functional block diagram providing yet another wireless network system architecture in which embodiments of the present invention may operate.

Other system architectures are also possible. For example, in another embodiment, the pre-emptive handoff functionality described herein can be implemented within the context of a single, autonomous access point, which can be configured to communicate with other access points and/or a central management platform 21 via SNMP, HTTP, or other protocols. See FIG. 6.

B. Operation of Preemptive Roaming Mechanism

As the following provides, the pre-emptive roaming functionality described herein can be used in a variety of contexts, such as to increase the efficiency of handing off wireless clients between access elements in a manner that optimizes quality of service (QoS). These and other objectives will become apparent from the exemplary embodiment described below.

To support the preemptive roaming functionality implemented by the client, as discussed in more detail below, the wireless network infrastructure supports at least one or more of the following:

1) An information element in the Association Response that contains a roaming list; in one implementation, the roaming list includes a central control element identifier per candidate to be used to minimize handoffs between central control elements.

2) An information element in the Probe Response that conveys the AP load; in one implementation, AP load is conveyed as a percent of maximum allowed number of associated clients.

3) An information element in the Beacon Frames that indicates the AP is part of a network that supports preemptive roaming.

4) The creation of a list of the APs and central control element identifier(s) that will be passed to the client as the roaming list.

5) A configurable SNR threshold, advertised in beacon or other frames, used by the client in the preemptive roaming mechanisms discussed below.

The above-described elements can be implemented as extensions to known wireless network protocols, such as the IEEE 802.11 specification and all amendments thereto, as discussed in more detail below.

Figure 4:
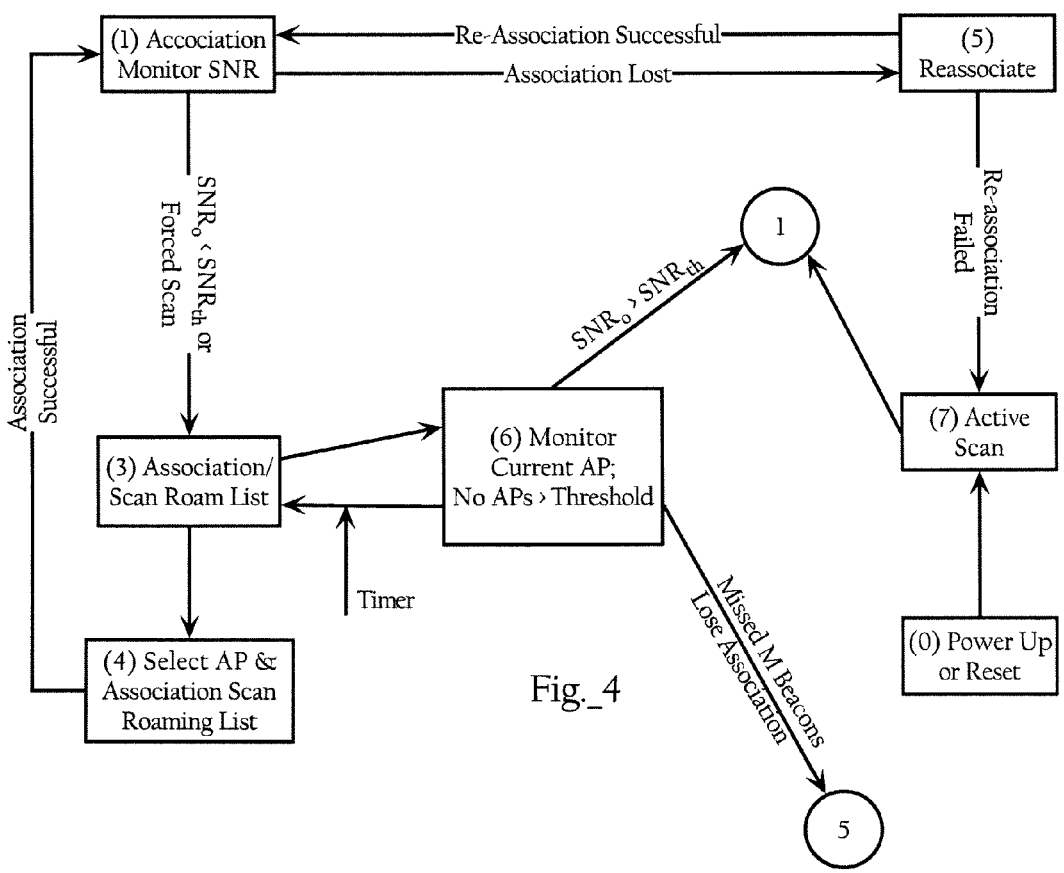
FIG. 4 is a state transition diagram illustrating operation of client functionality directed to the pre-emptive roaming functionality of the present invention.

In one implementation, the wireless network interface driver implemented on the wireless client switches to the preemptive roaming mode illustrated in the state diagram of FIG. 4 upon detection of an access point that advertises support for preemptive roaming in an information element ID in the beacons frames. As discussed in more detail below, in the preemptive roaming mode, the client obtains a roaming candidate list in the association response packet when it associates to an access point. The client uses this list of roaming candidates to find another access point when the preemptive roaming threshold is reached. During a pre-emptive roaming decision phase, the client alternates between scanning for access points on the roaming list with directed probes and moving data traffic to minimize packet latency. In the case that the preemptive roaming fails or the client loses connectivity with the network an active or passive scan of all available channels is conducted to find an access point and re-establish connectivity.

In one implementation, the preemptive roaming mechanism can be configured to achieve one or more of the following design goals.

1) The preemptive roaming algorithm can be enabled by the user via a client utility or it will automatically be enabled when the client has located an Access Point which advertises the preemptive roaming capability in its beacons and probe responses. Otherwise, a standard WLAN roaming algorithm can be used.

2) The preemptive roaming algorithm, in some implementations, can be designed to minimize broadcast probe request traffic.

3) The preemptive roaming algorithm can be configured to limit the time that a client is off channel to perform a scan, while the client is associated and has network connectivity.

4) The preemptive roaming algorithm, in some implementations, can be configured to limit the number of clients that can be connected to a single AP so that load balancing requirements, if any, are met.

5) The preemptive roaming handoff can be preemptive in nature and roam to another access point before losing connectivity to the associated access point.

6) The preemptive roaming mechanism can also be pre-emptive relative to a desired QoS attribute by configuring the SNR thresholds to scan for other access points that have an SNR sufficient to support a desired data rate. The SNR threshold, in one implementation, is set above the minimum SNR required to support a desired data rate to allow the mechanism time to locate and associate to another AP before the signal quality of the current access point falls below the minimum SNR.

As discussed in more detail below, while in the associated state the client monitors the SNR of the associated access point at regular intervals. If the client ever loses network connectivity it scans the list of roaming candidates with directed probe requests (probe requests sent to the broadcast MAC address with specific SSID in the SSID information element) before transitioning to the state of total loss of network connectivity and broadcast SSIDs. When a client has no connection to an access point, it will perform an active scan using broadcast probe requests to find an access point. A complete passive scan, in one implementation, will take (100 ms dwell time+5 ms switching overhead) per channel*20 channels=2.0 seconds.

FIG. 4 shows a state diagram corresponding to the preemptive roaming algorithm according to one implementation of the present invention. State 1 is the desired, stable state of being associated with an access point with a high SNR. During this state, the client monitors the SNR corresponding to frames received from the current access point. The goal of the preemptive roaming algorithm, in one implementation, is to be in state 1 and, when not in state 1, to get back to state 1 within 300 msec (or other acceptable time frame) and continue to move data while scanning for a new access point during the preemptive handoff. Generally speaking, from state one, one of two things can happen. The first is the loss of network connectivity to the associated access point and the transition to a non-associated state where the client will try to re-associate with the access point with which it just lost connectivity. The second possibility is a drop in the SNR between the client and the current access point below the preemptive roaming threshold which will cause the client to transition to the scanning state to select a new access point. If the client finds an access point that exceeds the SNR of the existing access point by a specified margin the client will attempt to associate with the new access point. If the client can not find a new access point or fails to associate with the new access point, the client will maintain its current association and keep looking for a new access point.

The following provides a description of the functions and processes associated with each state in the state diagram of FIG. 4.

B.1. State 7—Active Scan (Network Connection Loss)

A wireless client enters the Active Scan State 7 during initial power up and when the preemptive roaming mechanism fails. In this state the client actively scans all channels looking for an access point. If the client can not find an access point within a specified time (e.g., default=10 seconds) a disconnect timer is used internally to notify the operating system of the loss in media connection. Any data being queued from the operating system network stack when in this state will only be queued until the driver's transmit (TX) data queues become full, at which point any new data received will be dropped by the driver. The disconnect timer, in one implementation, defaults to the same value used by the normal wireless network interface driver (e.g., 10 seconds). When the timer expires, the operating system is notified of the loss in media connection and the client state machine remains in the active scan state (7).

B.1.a. Wireless Client Functionality

Figure 3:
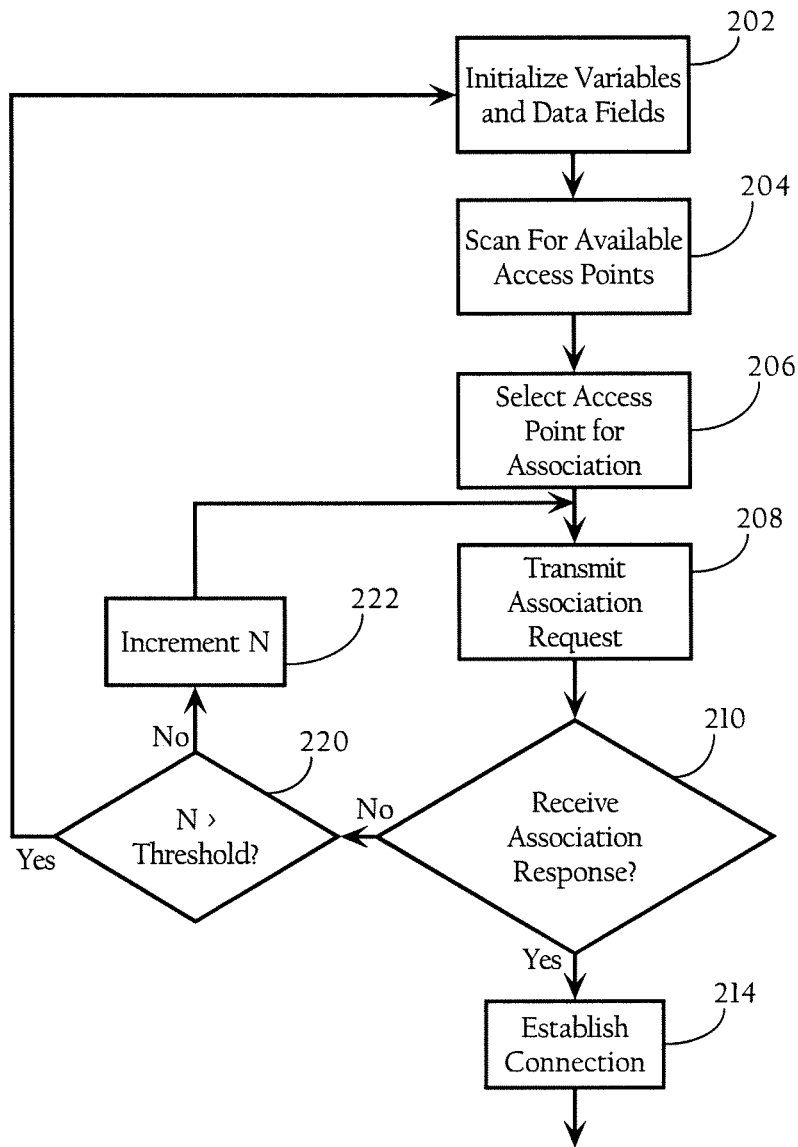
FIG. 3 is a flow chart diagram providing a method, executed by a wireless client, directed to an association mechanism according to an embodiment of the present invention.

As FIG. 3 illustrates, upon start up or other event where a wireless client initializes a scan for access points with which to associate, the wireless client initializes variables and data fields associated with the scanning and directed authentication functionality described herein (202). For example, the wireless client may reset an association attempt counter to zero, or reset a table or list of detected access points or elements. The wireless client transmits Probe Requests and then scans its airspace on one to a plurality of operating channels for access points (204). In one embodiment, the wireless client scans all available channels in the region and listens to the Beacon or Probe Response Frames transmitted by access elements 12, 14, for example, in that region. The wireless client stores the RSSI (Received Signal Strength Indicator) and/or Signal to Noise Ratio (SNR) of the Beacon or Probe Response Frames and other relevant information, such as BSSID, encryption (on/off), load metrics, etc. After finishing the scan, the wireless client, in one embodiment, uses conventional processes to select an access element 12 or 14 with which to initially associate (206). For example, as discussed above, the wireless client can select the access element with the maximum RSSI or SNR, given that the selected access element meets other requirements (usually the BSSID, WEP encryption, and other options) as well. Of course, other selection algorithms can be used, whether or not involving extensions to the IEEE 802.11 protocol or other applicable wireless protocol.

After selection of an access element, the wireless client transmits an association request (208) to the selected access element. In some implementations, wireless client may first transmit an authentication frame and receive an authentication frame in response. In one implementation, the association request transmitted by the wireless client includes an information element containing a list of access elements detected by the wireless client and may include other information such as RSSI or other signal related values (e.g., Signal-to-Noise Ratio, etc.). As FIG. 3 illustrates, the wireless client, in one embodiment, waits a threshold period of time for an association response from the selected access element (210). If no response is received, the wireless client repeats the process a configurable number (N) times (220, 222). If after N attempts, the selected access element does not respond, the wireless client reinitializes the access element scan.

If the access element responds, the wireless client establishes or completes the wireless connection (214) according to the applicable wireless protocol. In one implementation, the access elements and central control elements are configured to accept association requests from the client. In one embodiment, as discussed in more detail below, the access element and/or central control element includes in the association response frame a roaming list including a list of access elements (identified, in one embodiment, by MAC address and BSSID). In one implementation, the roaming list is based on the top N access elements that detect the client during the active scan. In one implementation, N equals 16. Still further, the top N access elements can be determined relative to detected SNR values of wireless frames transmitted by the wireless client during the scan (as detected by the access elements) (see below). Other signal attributes, such as signal strength may also be used. In one implementation, the roaming list can be statically defined by a network administrator, or be augmented by a statically defined list of access elements. As discussed in more detail below, the roaming list is used by the client in a preemptive roaming mechanism.

B.1.b. Access Element/Central Control Element Functionality

Figure 2:
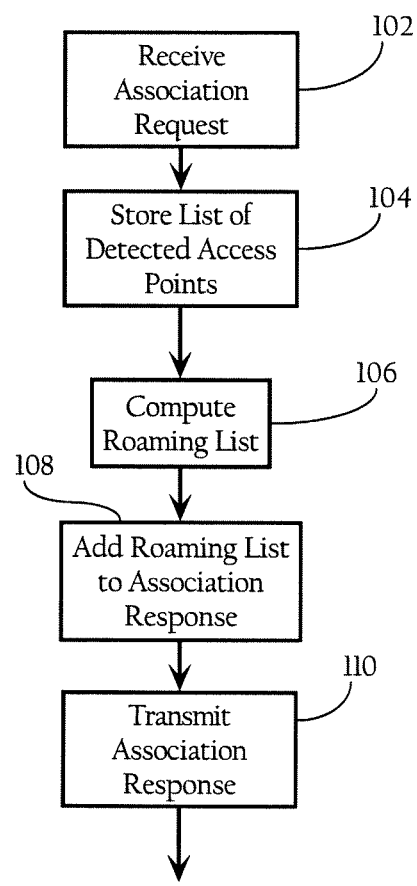
FIG. 2 is a flow chart diagram showing a method describing an association mechanism according to an embodiment of the present invention.

FIG. 2 sets forth a method, according to an embodiment of the present invention, executed on the access point side of the wireless network environment. That is, the method described herein may be performed by a central control element 24 operating in connection with an access element 12, or by a conventional access point architecture where the data link layer functions are not distributed between two components. See FIG. 6. For didactic purposes, the embodiment described herein operates in a distributed, hierarchical wireless network environment including at least one central control element 24 and a plurality of access elements 12, 14, etc. Omitted from FIG. 2 is a description of other data link layer functionality not immediately relevant to the present invention, such as the transmission of Beacon or Probe Response Frames by the access elements.

As FIG. 2 provides, when an access element 12 receives an association request from a wireless client (102) it tunnels the association request to central control element 24. The central control element 24, in one embodiment, stores, in association with an identifier (e.g., MAC address) of the wireless client, a list of access elements that either detected the wireless client (e.g., by detecting a probe request) or a list of access elements detected by the wireless client provided in the association request (e.g., by receiving Beacon or Probe Response Frames during its scan) (104). More specifically, as discussed above, in one embodiment, the association request includes a list of access elements detected by the wireless client and may include other information such as RSSI or other signal related values (e.g., Signal-to-Noise Ratio, etc.). In another embodiment, the central control element 24 by virtue of managing other access elements, such as access element 14, and being able to communicate with other central control elements, such as central control element 26, can compile a list of access elements that detected the Probe Requests of the wireless client. This list can also be augmented to include additional information such as the RSSI or other signal attributes associated with the Probe Requests. In one embodiment, the central control elements 24, 25, 26 are configured with the computer network addresses (e.g., MAC address, IP address, etc.) of the other central control elements to exchange the wireless client identifiers of detected wireless clients, as well as which access element(s) detected the wireless clients. In one embodiment, the central control elements 24, 25, 26 maintain this information in a table or other suitable data structure and synchronize the data structure with other central control elements as appropriate. In addition, the central control elements 24, 25, 26 can also monitor, and exchange with other central control elements, the load (e.g., number of clients, data throughput, duty cycle, etc.) associated with the access elements.

As FIG. 2 shows, central control element 24 then computes a roaming list for the client (106). The roaming list may be computed according to any suitable algorithm or process, incorporating various factors and criteria, configured to achieve a variety of objectives. For example, the roaming list may be determined with respect to detected SNR levels. In addition, the roaming list may be based on the access elements that are operably connected to the same central control element 24. The roaming list may also be computed with regard to other factors, such as statically defined permissions based on wireless client MAC addresses, security policies, and the like. For example, wireless clients associated with guests or visitors to an enterprise may be forced to associate with only a subset of access elements. In yet other embodiments, the roaming list may be computed with respect to geographic/location considerations, as well as detected radio-frequency connectivity or overlap among access elements. For example, as disclosed in U.S. application Ser. No. 10/447, 735, the access elements can be configured to exchange so-called neighbor messages to allow the central control elements or a central management platform to map the RF connectivity of the access elements. The roaming list can include the set of access elements having RF connectivity within a given signal strength threshold to the access element initially selected by the wireless client. In another embodiment, the central control elements can be configured with geographic or other location information relating to the access elements and select or further filter the set of access elements based on geographic proximity to the access element initially selected by the wireless client. For example, the roaming list can be configured to provide the wireless client with a list of good roaming candidates at the edge of the RF coverage of the current AP. The roaming list can be created in several ways to maximize the probability of a success pre-emptive roam. For example, the roaming list can be created based on the N neighboring access points with the best SNRs. In another implementation, the roaming list can be created based on identifying one or more neighboring access points above a threshold dBm, and one or more neighboring access points with SNRs below a threshold dBm (as detected above).

In one embodiment, after the roaming list is computed, the central control element 24 adds the roaming list to the association response (108) and transmits the association response to the client (110). In one embodiment, the table or other data structure included in the association response can include a variety of information. In one embodiment, the table can include the access element identifier, such as MAC address, and the BSSID of the access element. The table can also include other parameters, such as the operating channel of the access element, as well as operational parameters and characteristics, such as current load, and duty cycle. In one embodiment, the association response can also include other information, such as the RSSI values of the Probe Requests detected at each access element.

B.2. State 1—Associated with Good SNR

As FIG. 4 illustrates, the preemptive roaming mechanism operates to return the wireless client to state 1, which is the desired state for the wireless client (i.e., associated with an access point with sufficient signal quality). As discussed below, the preemptive roaming algorithm implemented by the client, in one implementation, attempts to maintain an association with an access point with a sufficient signal quality (e.g., SNR, RSSI, etc.) to support a desired data rate or other QoS measure. The preemptive roaming algorithm, in one implementation, uses preemptive roaming and handoffs to avoid having to use a full active scan (i.e. state 7) (and the requisite time to accomplish the full scan) to complete a handoff of the client to another AP. During the association phase with the current AP, the client as discussed above has obtained a list of roaming candidates from the AP. In addition, while associated with the current AP, the client creates a filtered SNR sample from a queue of measured SNR samples every 100 msecs (or other sampling interval). In another implementation, the sample interval can be tied to the beacon interval employed by the access point. In one implementation, the client samples only the SNR detected during reception of the beacon frame. The detected SNR is then provided to an SNR filter (see below), the output of which is compared to a threshold SNR. In another implementation, other frames transmitted by the current access point can be sampled during the sampling interval. In such an embodiment, the client sums the SNR values obtained during reception of the N frames in the sampling interval and divides by the number of frames to provide an average SNR value. The measured SNR samples are taken from beacons and overheard packets from the associated access point. The average SNR value is then used as an input to the SNR filter (see below). Given a beacon interval of 100 msec there should be at least one new measured SNR sample every 100 msecs. In addition, if no wireless frames (e.g., beacons) are received from the current AP during the last interval, it supplies the threshold SNR value to the SNR filter.

As discussed in more detail below, the SNR filter is configured to prevent sudden changes in SNR to cause a preemptive roaming event, but to be sensitive enough to detect a sufficient change in SNR to support desired QoS parameters. For example, given a filter time constant of 3 samples a steady state change in SNR will be detected in approximately 300 msecs. If the filtered SNR falls below the SNR requirement of the minimum supported data rate plus a configurable margin the client initiates a preemptive roaming event, transitioning to State 3, and finds a new AP with which to associate.

B.2.a. SNR Filter

The following provides a description of an SNR filter according to one implementation of the present invention. In one implementation, the SNR filter is a single pole filter, the time constant of which is configured to achieve desired QoS parameters. As discussed above, in one implementation, for each beacon overheard from an access point, an SNR sample is obtained. These SNR samples are fed into a recursive, single pole filter. The output of the filter is used to make state transition decisions and AP selection decisions. To make mobility decisions at a rate of a handoff every 5 seconds, for example, the SNR information should preferably be sufficient to get a filter output every beacon interval (e.g., 100 msecs). Given a beacon interval of 100 msec there should ideally be at least 1 SNR sample available every 100 msecs. However, in one implementation, the average SNR acquired over a given beacon interval from any frames transmitted by the current AP and detected by the client is fed into the SNR filter. In one implementation, the filter coefficients are selected to allow the filter output to settle to a steady state within a desired time (e.g., 1 second or 10 samples). The following equation describes a SNR single pole recursive filter according to one implementation of the invention:

$$SNRout=\beta 1*SNRold+\alpha 0*SNRnew, \text{ where } \beta 1=x, \text{ and } \alpha 0=1-x.$$

The value for x can be directly specified, or found from the desired time constant of the filter. That is, x is configured to achieve a time delay for the recursive filter such that it adjusts to a steady state input within a desired time interval. For example, assuming a sample interval of 100 ms, it is desired in some wireless environments to adjust to a steady state input within 3 samples. One of ordinary skill in the art will now how to configure x to achieve this requirement. Of course other network environments may require different filter delay properties. Similar to the signal decay in a RC filter circuit, d is the number of samples it takes for a recursive filter to decay to this same level: $x=e^{\wedge}(-1/d)$. This equation relates the amount of decay between samples, x, with the filter's time constant, d, the number of samples for the filter to decay to 36.8%. For instance, a sample-to-sample decay of x=0.86 corresponds to a time constant of 6.63 samples. There is also a fixed d'6.63 relationship between x and the −3 dB cutoff frequency, of the digital filter: fC. This provides three ways to find the "a" and "b" coefficients, starting with the time constant, the cutoff frequency, or just directly picking x.

B.3. State 3—Scan Roaming List

State 3 (Scan Roaming List) is the first step towards a preemptive roaming. In this state, the client sends directed probes to access points in the roaming candidate list to gather the SNR and load information from the access points in preparation for choosing a new access point in State 4. State 3, in one implementation, is made up of alternating scan and traffic windows. During the scan window directed probe requests are sent to access points in the roaming candidate list for the duration of an AP dwell time. The use of directed probe requests are preferred as access points are configured to respond to directed probe requests faster than broadcast probe requests. In one implementation, there are multiple AP dwell times in each scan window; however, it typically takes more than one scan window to scan all access points on the roaming list.

The length of the scan window determines the maximum amount of time the AP will be off channel and thus the maximum packet delay for user traffic. During the traffic window, the client goes back to the channel of its current access point to move data both up and down. In one implementation, the default scan and traffic windows are 50 and 25 msecs, respectively. In one implementation, the traffic windows are oriented in time to allow the client to switch to the operating channel of the current AP in order to receive at least one of every two beacon frames transmitted by the current AP. In one implementation, the time that the client is in state 3 is limited by default to 300 msecs, alternating between scan windows (sending directed probe requests to access points on the roaming list) and traffic windows. Of course, the 300 msec time limit is an engineering design choice; that is, the maximum amount of time in this state is function of the environment and how fast the SNR changes, as well as the desired QoS provided to the clients.

To ensure a good estimate of the SNR to the current AP, the client, in one implementation, sends directed probe requests to the current AP after scanning for the APs in the candidate roaming list. The current AP is the last AP probed to get the most up to date picture of the current SNR values. The average SNR from the samples resulting from the probe responses of the current AP, in one implementation, is then used as the point of reference during the selection process rather than the SNR filter output. In the event that the current AP does not respond to any probe requests, the client will assume that the AP is out of range and will use an SNR average of 0 as the comparison value. To be considered, a candidate AP, in one implementation, must have a SNR average above the current AP's SNR average by a specified margin (e.g., default is 6 dB). If the current AP does not respond and no candidate AP is valid (none responded to probes), the client, in one implementation, transitions to the re-association state (5) and possibly to the active scan state (7).

In one implementation, there are two timers used in this state. The first is an interrupt driven NDIS driver and the second is a polled hardware timer. The probe request timeout uses the interrupt driven NDIS timer provided by the operating system implemented on the client. This timer has a typical limited accuracy of −0/+6 msecs. Thus a 3 msec probe request timeout may take 3 to 10 msecs. The dwell time per access point is driven by polling an NDIS hardware timer provided by the operating system. The dwell time limits the maximum number of directed probe requests that will be sent by the client to a given access point. A typical probe request/probe response transaction takes 0.5 to 1 msec under no load conditions. The hardware timer is accurate to within 100's of microseconds. To ensure that a minimum number of probe requests are tried per AP, a mechanism provides a dwell time sufficient for a minimum number of probe requests are tried per AP.

Given an RF redundancy factor of 3 to 6, 3 to 6 access points on the roaming list with a very high SNR are most likely covering the same area as the current access point and are not likely roaming candidates. (Note: Having more than one AP to cover the same area is needed in some wireless network environments for failure scenarios and to satisfy peak capacity requirements.) In one implementation, it is desirable for a roaming candidate to be on the list 99% of the time under all conditions. Given a channel switching time of 4 msecs and a Directed Probe Request/Probe Response transaction time of 2 msecs under no load conditions, the SNR of an access point can be characterized in 10 msecs or less with 3 directed probe requests. Given a maximum off channel time of 100 msecs, 6 access points can be typically characterized in 100 msecs. At the end of 100 msecs or completion of scanning the entire roaming list the client will enter the association state and attempt to associate with a new access point. In response to the directed probe request the access point sends the following information in the probe response: 1) the central control element (switch) identifier, 2) the central control element group (resiliency) identifier, and 3) the load on the access point.

B.4. State 4—Selection of AP

In this state the client selects an access point based on the results of the scan and attempts to associate with the selected access point. In one implementation, the selection of an access point is based on the SNR and load factor obtained in State 3 from the probe responses and the central control element (switch) identifier obtained in state 1 from the roaming candidate list. The selection process for the new AP works by first ranking the candidate APs by SNR. The SNR ranking is from best (largest SNR) to worst. All roaming candidates that have a SNR better than the current AP's SNR (or 25 dB if the current AP's SNR is greater than 25) by the specified margin are kept to form a new association list. This new list, in one implementation, is then broken into 6 groups:

1. Group 1—APs with a load factor <AP load threshold and a switch ID equal to that of the current AP;
2. Group 2—APs with a load factor <AP load threshold and resiliency ID equal to that of the current AP;
3. Group 3—APs with a load factor <AP load threshold and neither a switch ID nor a resiliency ID equal to that of the current AP;
4. Group 4—APs with a load factor >AP load threshold and a switch ID equal to that of the current AP;
5. Group 5—APs with a load factor >AP load threshold and a resiliency ID equal to that of the current AP; and
6. Group 6—APs with a load factor >AP load threshold and neither a switch nor a resiliency equal to that of the current AP.

The resiliency identifier refers to a group of central control elements. In a typical network deployment, all access points corresponding to a given central control element are located to provide contiguous RF coverage. Similarly, groups of access points (defined by corresponding switch) are also located to provide contiguous, overlapping coverage to provide redundancy and thus fail over support. The switch and resiliency identifiers, and their use in the preemptive roaming mechanism described herein, are based on this concept of grouping.

Within each group the APs are ranked by SNR. The client will then try to associate with an AP starting with group 1 and moving to group 6. The groups 1-6 are ordered, in the implementation set forth above, in a manner that biases the wireless client towards the selection of an AP that is associated with the same central control element (switch) as the current AP, and if none, to an AP associated with the same resiliency identifier, to potentially reduce the latency associated roaming to an access point on a different central control element and/or resiliency group. The AP load threshold is a utilization factor that indicates what percentage of the AP's capacity in terms of associated clients is being utilized. For example, given an AP's maximum capacity of 12 clients, an access point will advertise a 50% utilization when there are 6 clients associated. In one implementation, the default maximum capacity of an AP is 12 and the default AP load threshold is 75%. If the re-association fails, the client will move to the next best AP in the list and attempt to associate. If the candidate list is exhausted with no successful re-association, the client will re-associate to the original AP and return to state 3 to re-scan the candidate list. As discussed in more detail below, if no candidate meets the minimum SNR and loading requirements, the client will maintain its association with the current AP and return to state 3 to re-scan the candidate list.

Of course, other selection algorithms are possible. For example, in a first step, the client ranks all detected access points having a detected SNR better than the current AP by the specified margin forming the "new association list" as described above. In a second step, the client eliminates from the list all access points with utilization greater than or equal to 110% allowing the system to accept and report overloading situations (105%). In a third step, the client picks the top two SNR-ranked APs and chooses the AP whose Switch ID is equal to current Switch ID. If neither of the top two SNR-ranked AP's has the same Switch ID as that of the current AP, the client then chooses the Top SNR-ranked AP.

B.5. State 5—Reassociation

The client transitions to State 5 when the client has stopped hearing beacons from its current access point. The reasons for going from state 1 to state 5 may include the following:
The current AP has failed; and
The client has moved out of the coverage area of the current AP very quickly. When the client finds itself in this state it will immediately try to re-associate with the original access point. If it fails to re-associate it will transition to the active scan state 7 to attempt to find an access point with which to associate.

B.6. State 6—Monitor/Backoff State

The monitor/backoff state will be entered when the client has completely scanned the entire candidate list 'n' consecutive times, and found no candidate AP having a better SNR than the current AP. In one implementation, n equals 3. While in the backoff state, the client continues to monitor the current AP's SNR by running the sampled SNR of beacon frames through the SNR filter. If the SNR filter output rises above the threshold plus the margin value, the client returns to the association state (1). In addition, if the client misses 'm' number of beacons from the current AP, the client will start an active broadcast scan and transition to the re-association state (5). In one implementation, the value used for m is the same as that used in the association/SNR monitor state (1) (e.g., 3 missed beacon packets). When the backoff state is entered, a backoff timer will be started. The backoff timer, in one implementation, is set with a value of 500 ms plus a random number of additional milliseconds between 0-500. If the client has not lost media connection with the current access point, and has not transitioned back to the association monitor state (1) when the backoff timer expires, the client shall transition to the candidate search state (3) again and re-scan the candidate list.

B.7. Other Possible States

The client may also support other possible states. For example, the client may support a mobility state. The client transitions to the mobility state when the change in SNR with respect to time exceeds a threshold indicating that the client is moving or the RF environment around the client is varying significantly. In this state the client will start monitoring the change in SNR (i.e. the first derivative) with respect to time of its roaming candidates in preparation for a handoff. Furthermore, other states may relate to supporting authentication or security mechanisms, such as WPA, or other encryption protocols.

C. Wireless Frame Formats

To implement the functions described above in an 802.11 WLAN environment, extensions to some 802.11 MAC Management frames may be required. This section describes the frame formats and information elements, according to one implementation of the invention, used to implement many of the functions that support preemptive roaming. In one implementation, the Beacon, Probe Response, Association Request, Reassociation Request, Association Response, Reassociation Response, and Disassociation frames carry an information element, and in one implementation a Vendor-specific information element. Each of these frames will be described. In addition, the format and content of the Vendor-specific information element is also described.

C.1. Beacon and Probe Response Frames

The Beacon and Probe Response frames both include the Vendor-specific information element following all information elements defined to be present in the frames by the IEEE 802.11 specification and its amendments. The Vendor-specific information element may appear more than once in a frame. The Beacon and Probe Response frames may include the WLAN Capabilities and AP Details information elements.

C.2. Association and Reassociation Request Frames

The Association Request and Reassociation Request frames both include the Vendor-specific information element following all information elements defined to be present in the frames by the 802.11 standard and its amendments. The Vendor-specific information element may appear more than once in a frame. The client also includes the AP details information element, which includes the mobility domain and address information which the client received in the previous successful association.

C.3. Association and Reassociation Response Frames

The Association Response and Reassociation Response frames both include the Vendor-specific information element following all information elements defined to be present in the frames by the 802.11 standard and its amendments. The Vendor-specific information element may appear more than once in a frame. The association and reassociation response frames may include the Roaming Candidate AP List and WLAN Capabilities information elements.

C.4. Disassociation Frames

The Disassociation frame will add the Vendor-specific information element following the Reason Code defined to be present in the frames by the 802.11 standard and its amendments. The Vendor-specific information element may appear more than once in a frame.

C.5. Vendor-Specific Information Element

The Vendor-specific information element is a standard information element defined in 802.11 where the Element ID value of 221 (0xdd) has been allocated by the 802.11 working group to designate an information element that may be used for carrying proprietary information. The 802.11 working group requires that the first three bytes following the Length be the OUI (IEEE-assigned Organizational Unique Identifier) of the vendor that has defined the particular information element being transmitted. The format of the Vendor-specific information element, according to an implementation of the present invention, is shown in the following Table.

TABLE 0-1

Vendor-specific Information Element Format

| ELEMENT ID (221) | LENGTH | OUI | INFORMATION FIELD |
|---|---|---|---|
| 1 BYTE | 1 BYTE | 3 BYTES | N BYTES |

For Vendor-specific information elements described herein, the value of the OUI field will be 0x000b85. For all Vendor-specific information elements where the OUI is 0x000b85, the first byte of the Information Field will be the Sub-element ID. The following table describes the allowable values for the sub-element ID.

TABLE 0-1

Sub-element ID Values

| SUB-ELEMENT ID | DESCRIPTION |
|---|---|
| 0 | RESERVED |
| 1 | CLIENT LIST OF APS |
| 2 | ROAMING CANDIDATE AP LIST |
| 3 | RESERVED |
| 4 | WLAN CAPABILITIES |

TABLE 0-1-continued

Sub-element ID Values

| SUB-ELEMENT ID | DESCRIPTION |
|---|---|
| 5 | AP DETAILS |
| 6-255 | RESERVED |

C.6. CLIENT List of APs Information Element

The CLIENT List of APs information element is used by a client to indicate the APs with which the client can communicate and the quality of that communication. The format of the information element is shown in the table below.

TABLE 0-2

CLIENT List of APs Format

| Length (bytes) | Description |
|---|---|
| 1 | Element ID (221 = Vendor-specific information element) |
| 1 | Length (number of bytes following this field = 5 + (n * 10)) |
| 3 | OUI (0x00, 0x0b, 0x85) |
| 1 | Sub-element ID (CLIENT List of APs = 1) |
| 1 | Number of AP descriptors (n) |
| n * 10 | AP descriptors 1 through n |

TABLE 0-3

AP Descriptor Format

| Length (bytes) | Description |
|---|---|
| 6 | BSSID of AP |
| 1 | PHY Type |
| 1 | Channel number of AP from Probe Response |
| 1 | Signal strength (dBm) |
| 1 | Signal quality (SNR, dB) |

The fields of the Candidate AP Descriptor are defined as follows.

BSSID: This is the 48-bit MAC address of the AP.

PHY Type: The value of this field indicates the PHY type on which the associated BSSID was discovered. The values for PHY Type are shown in the following table.

TABLE 0-4

CLIENT List of APs PHY Type

| PHY Type | PHY |
|---|---|
| 0 | 802.11b |
| 1 | 802.11a |
| 2 | 802.11g (OFDM channel) |
| 3-255 | Reserved |

Channel number: This is the channel number, as defined for the PHY and country code on which the information element is transmitted. For example, when transmitted on an 802.11b PHY in the US country code, the channel number will be 1 through 11, inclusive. In the JP country code, the channel number will be 1 through 14, inclusive.

Signal strength: This is the value, in dBm of the signal strength of the last transmission from the client received by the AP described by the descriptor.

Signal quality: This is the value, in dB of the signal to noise ratio (SNR) of the last transmission from the client received by the AP described by the descriptor.

C.7. Roaming Candidate AP List Information Element

The Roaming Candidate AP List information element is used by the switch/AP to indicate to the client which other APs the client should scan and possible associate with during the pre-emptive scanning mode. The format of the information element is shown in Table 0-5. The Candidate AP Descriptor format is shown in Table 0-6.

TABLE 0-5

Roaming Candidate AP List Format

| Length (bytes) | Description |
| --- | --- |
| 1 | Element ID (221 = Vendor-specific information element) |
| 1 | Length (number of bytes following this field = 5 + (n * 13))) |
| 3 | OUI (0x00, 0x0b, 0x85) |
| 1 | Sub-element ID (Roaming Candidate AP List = 2) |
| 1 | Number of Candidate AP Descriptors (n) |
| n * 13 | Candidate AP descriptors 1 through n |

TABLE 0-6

Candidate AP Descriptor Format

| Length (bytes) | Description |
| --- | --- |
| 6 | BSSID of candidate AP |
| 1 | PHY Type |
| 1 | Channel number |
| 1 | Local subnet indicator (local subnet = 0, foreign subnet = 1, same switch = −2, unknown = −1) |
| 1 | Signal strength of last reception from CLIENT (dBm) |
| 1 | Signal quality of last reception from CLIENT (SNR, dB) |
| 1 | Time since last reception from CLIENT (seconds) |
| 1 | Load factor (%) |

The fields of the Candidate AP Descriptor are defined as follows.

BSSID: This is the 48-bit MAC address of the AP

PHY Type: The value of this field indicates the PHY type on which the associated BSSID was discovered. The values for PHY Type are shown in Table 0-7.

TABLE 0-7

Candidate List of APs PHY Type

| PHY Type | PHY |
| --- | --- |
| 0 | 802.11b |
| 1 | 802.11a |
| 2 | 802.11g (OFDM channel) |
| 3-255 | Reserved |

Channel number: This is the channel number, as defined for the PHY and country code on which the information element is transmitted. For example, when transmitted on an 802.11b PHY in the US country code, the channel number will be 1 through 11, inclusive.

Local subnet indicator: The local subnet indicator value of −2 that the AP described by the descriptor is on the same switch as the AP the client is associated with.

Signal strength: This is the value, in dBm of the signal strength of the last transmission from the client received by the AP described by the descriptor. If there is no information on the last transmission received by the AP, the value of this field shall be −127.

Signal quality: This is the value, in dB of the signal to noise ratio (SNR) of the last transmission from the client received by the AP described by the descriptor. If there is no information on the last transmission received by the AP, the value of this field shall be −127.

Time: This is the value, in seconds, of the time since the last transmission from the client was received by the AP described in the descriptor. Values from 0 to 254 indicate the time since the last transmission was received. A value of 255 indicates the value is not valid.

Load factor: This is the value, in per cent, of the load carried by the AP described in the descriptor.

C.8. WLAN Capabilities

The WLAN Capabilities information element is used by the central control element (switch) and AP to indicate the features and functions present in the WLAN that a client device, such as a client, can make use of. The format of the information element is shown in Table 0-8.

TABLE 0-8

WLAN Capabilities Format

| Length (bytes) | Description |
| --- | --- |
| 1 | Element ID (221 = Vendor-specific information element) |
| 1 | Length (number of bytes following this field = 5) |
| 3 | OUI (0x00, 0x0b, 0x85) |
| 1 | Sub-element ID (WLAN Capabilities = 4) |
| 1 | Capabilities (bit significant) |

There is a single field specific to this information element.

Capabilities: This field is a variable length bit field. The bit field is segmented at each byte boundary to prevent ambiguity in the transmission order as the bit field expands as new capabilities are included in the system. Each bit of this field has significance independent of any other bit in the field. The format of the field is shown in Table 0-9.

TABLE 0-9

Format of the Capabilities Field

| Byte | Bit | Description |
| --- | --- | --- |
| 0 | 0 | Proxy ARP |
| 0 | 1 | Platinum Queue/Dynamic QoS |
| 0 | 2 | Cooperative Handoff |
| 0 | 3 | Single Authentication |
| 0 | 4 | Preemptive roaming |
| 0 | 5-7 | Reserved (transmit as 0, ignore on reception) |

The bits of the Capabilities field are defined below.

Proxy ARP: When the value of this bit is 1, the switch/AP provides proxy ARP service for associated client devices. When the value of this bit is 0, no proxy ARP service is provided.

Platinum Queue/Dynamic QoS: When the value of this bit is 1, the switch/AP provides dynamic QoS using the Vendor-specific information element and reassociation of the client device. When the value of this bit is 0, no dynamic QoS service is provided.

Cooperative Handoff: When the value of this bit is 1, the switch/AP provides cooperative handoff services using the Vendor-specific information element. When the value of this bit is 0, no cooperative handoff service is provided.

Single Authentication: When the value of this bit is 1, the switch/AP provides single authentication services for 802.1X as the client roams from one AP to another in the same mobility group. When the value of this bit is 0, no single authentication service is provided.

Preemptive roaming: When the value of this bit is 1, the switch and AP is operating in preemptive roaming mode. In preemptive roaming mode, load balancing is performed by the client, based on the Roaming Candidate AP List and either active or passive scanning by the client. The switch/AP, in one implementation, will not reject an association/reassociation attempt in preemptive roaming mode.

C.9. AP Details

The AP Details information element is used to announce information about the AP and its associated switch. The client will use this information when roaming from one AP to another. The format of the information element is shown in Table 12.

TABLE 12

AP Details Format

| Length (bytes) | Description |
| --- | --- |
| 1 | Element ID (221 = Vendor-specific information element) |
| 1 | Length (number of bytes following this field = 13) |
| 3 | OUI (0x00, 0x0b, 0x85) |
| 1 | Sub-element ID (AP Details = 5) |
| 1 | Load Factor (%) |
| 8 | Mobility Group Identifier |
| 4 | Controller Address |

The fields of the AP Details information element are defined as follows.

Load factor: This is the value, in per cent, of the load carried by the AP described in the descriptor. This value is ignored when the IE is included in the client's Association Requests Mobility Group Identifier: This is a unique value that identifies all of the switches, and the APs that are connected to these switches, in a common mobility group.

Controller Address: This is the IP address of the AP (or controller in a hierarchical system)

C.9. Client Details Information Element

The Client Details information element is used to announce information about the AP and its associated switch. The client will use this information when a client roams from one AP to another. The format of the information element is shown in Table 11.

TABLE 11

Client Details Format

| Length (bytes) | Description |
| --- | --- |
| 1 | Element ID (221 = Vendor-specific information element) |
| 1 | Length (number of bytes following this field = 13) |
| 3 | OUI (0x00, 0x0b, 0x85) |
| 1 | Sub-element ID (Client Details = 6) |
| 4 | Hand-off Counter |
| 8 | Mobility Group Identifier |
| 4 | Controller Address |

The fields of the Client Details information element are defined as follows.

Hand-off Counter: This counter maintained by the client and is monotonically increased upon every association request.

Mobility Group Identifier: This value is sent to the client in the AP Details IE and is cached by the client when it successfully associates with an AP.

Controller Address: This value is sent to the client in the AP Details IE and is cached by the client when it successfully associates with an AP.

The invention has been explained with reference to specific embodiments. Other embodiments will be evident to those of ordinary skill in the art. For example, the present invention can also be applied to WLAN architectures beyond the hierarchical WLAN architecture described above. For example, in another embodiment, the preemptive roaming functionality described herein can be implemented within the context of single, autonomous access points, which can be configured to exchange necessary information with other similarly configured access points and communicate with such access points over the wired network to coordinate configuration and other management tasks. See FIG. 6. This distributed system of autonomous access points can be managed by a central network management platform 21 operative to distribute configuration information to the access points. Still further, the network interface driver application that includes the preemptive roaming functionality described herein, can be distributed as a software download or on a storage medium, such as a CD, DVD and the like. In addition, although the embodiments described above, involve extensions to the 802.11 wireless networking protocol, the preemptive roaming mechanism can be applied to any suitable wireless network environment. It is, therefore, intended that the claims set forth below not be limited to the foregoing embodiments.

What is claimed is:

1. A wireless client, comprising:
   a wireless network interface;
   a processor;
   a memory;
   a wireless network interface driver application, stored in the memory, comprising instructions operable to cause the processor and the wireless network interface to:
      receive, from a first access element, a roaming list identifying at least one candidate access element of one or more candidate access elements other than the first access element, wherein the roaming list is transmitted from the first access element to the wireless client in connection with an association between the first access element and the wireless client;
      monitor, during an associated state with the first access element, one or more radio frequency signals transmitted by the first access element relative to a signal attribute;
      when the wireless client determines that the monitored signal attribute crosses a threshold value, then alternate, at least a plurality of times, between:
         a pre-emptive scanning mode to actively scan for the one or more candidate access elements identified in the roaming list with which to associate by sending directed probes to the one or more candidate access elements identified in the roaming list, and
         a traffic mode to communicate with the first access element to transmit or receive wireless frames;
      receive a response from at least a portion of the one or more candidate access elements;
      for each of one or more of the candidate access elements from which the response was received, group the candidate access element into one of a plurality of groups, the grouping being based at least on a load threshold of the candidate access element and either a switch identifier of the candidate access element or a resiliency identifier of the candidate access element, the plurality of groups being ranked; and
attempt to associate with one of the candidate access elements grouped into the highest ranked group.

2. The wireless client of claim 1 wherein the signal attribute is signal-to-noise ratio (SNR).

3. The wireless client of claim 1 wherein, to monitor the one or more radio frequency signals transmitted by the first access element and to determine whether the monitored signal attribute crosses a threshold value, the wireless network interface driver application further comprises instructions operable to cause the processor and the wireless network interface to:
measure the signal attribute of each of one or more radio frequency signals corresponding to wireless frames transmitted by the first access element;
apply a filter to the measured signal attributes; and
compare the filtered signal attributes to the threshold value.

4. The wireless client of claim 1 wherein the wireless network interface driver application further comprises instructions operable to cause the processor and the wireless network interface to:
if connectivity is lost with the first access element, perform a scan of a plurality of frequency channels to identify available access elements with which to associate.

5. The wireless client of claim 4 wherein the wireless network interface driver application further comprises instructions operable to cause the processor and the wireless network interface to:
select an access element identified during the scan of the plurality of frequency channels;
transmit an association request to the selected access element; and
transmit to the selected access element a list of access elements detected during the scan of the plurality of frequency channels.

6. The wireless client of claim 5 wherein the selection of the selected access element is based at least in part on signal information gathered during the pre-emptive scanning mode.

7. The wireless client of claim 5 wherein the selection of the selected access element is based at least in part on load information obtained from the one or more candidate access elements scanned during the pre-emptive scanning mode.

8. The wireless client of claim 1 wherein the roaming list is appended to an association response transmitted from the first access element to the wireless client in response to an association request transmitted from the wireless client.

9. A method, comprising:
receiving from a first access element, by a wireless client device, a roaming list identifying at least one candidate access element of one or more candidate access elements other than the first access element, wherein the roaming list is transmitted from the first access element to the wireless client in connection with an association between the first access element and the wireless client;
monitoring, by the wireless client device, during an associated state with the first access element, one or more radio frequency signals transmitted by the first access element relative to a signal attribute;
when it is determined by the wireless client device that the monitored signal attribute crosses a threshold value, then alternating, at least a plurality of times, between:
a pre-emptive scanning mode to actively scan for one or more candidate access elements identified in the roaming list with which to associate by sending directed probes to the one or more candidate access elements identified in the roaming list, and
a traffic mode to communicate with the first access element to transmit or receive wireless frames;
receiving a response from at least a portion of the one or more candidate access elements;
for each of one or more of the candidate access elements from which the response was received, grouping the candidate access element into one of a plurality of groups, the grouping being based at least on a load threshold of the candidate access element and either switch identifier of the candidate access element or a resiliency identifier of the candidate access element, the plurality of groups being ranked; and
attempting to associate with one of the candidate access elements grouped into the highest ranked group.

10. The method of claim 9 wherein the signal attribute is signal-to-noise ratio (SNR).

11. The method of claim 9 wherein monitoring one or more radio frequency signals transmitted by the first access element and determining whether the monitored signal attribute crosses the threshold value comprises:
measuring the signal attribute of each of one or more radio frequency signals corresponding to wireless frames transmitted by the first access element;
applying a filter to the measured signal attributes, and
comparing the filtered signal attributes to the threshold value.

12. The method of claim 9 further comprising, if connectivity is lost with the first access element, performing, by the wireless client device, a scan of a plurality of frequency channels to identify available access elements with which to associate.

13. The method of claim 12 further comprising:
selecting, by the wireless client device, an access element identified during the scan of the plurality of frequency channels;
transmitting, by the wireless client device, an association request to the selected access element; and
transmitting, by the wireless client device, to the selected access element a list of access elements detected during the scan of the plurality of frequency channels.

14. The method of claim 13 wherein the selection of the selected access element is based at least in part on signal information gathered during the preemptive scanning mode.

15. The method of claim 13 wherein the selection of the selected access element is based at least in part on load information obtained from the one or more candidate access elements scanned during the pre-emptive scanning mode.

16. The method of claim 13 wherein each access element scanned during the preemptive scanning mode identifies a central control element; and wherein the selection of the selected access element is based at least in part on the central control element identified by the selected access element.

17. An apparatus, comprising:
means for wirelessly communicating with one or more access elements;
means for receiving from a first access element a roaming list identifying at least one candidate access element of one or more candidate access elements other than the first access element, wherein the roaming list is transmitted from the first access element to the wireless client in connection with an association between the first access element and the apparatus;
means for monitoring, during an associated state with the first access element, one or more radio frequency signals transmitted by the first access element relative to a signal attribute;

means for alternating, when the signal attribute crosses below a threshold value, at least a plurality of times between:
- a pre-emptive scanning mode to actively scan for one or more candidate access elements identified in the roaming list with which to associate by sending directed probes to the one or more candidate access elements identified in the roaming list, and
- a traffic mode to communicate with the first access element to transmit or receive wireless frames;

means for receiving a response from at least a portion of the one or more candidate access elements;

for each of one or more of the candidate access elements from which the response was received, means for grouping the candidate access element into one of a plurality of groups, the grouping being based at least on a load threshold of the candidate access element and either a switch identifier of the candidate access element or a resiliency identifier of the candidate access element, the plurality of groups being ranked; and means for attempting to associate with one of the candidate access elements grouped onto the highest ranked group.

* * * * *